United States Patent

[11] 3,627,351

| | | |
|---|---|---|
| [72] | Inventors | Robert Paul Zimmerman<br>Champaign, Ill.;<br>Kenneth Quentin Kessler, Dubuque, Iowa |
| [21] | Appl. No. | 30,695 |
| [22] | Filed | Apr. 22, 1970 |
| [45] | Patented | Dec. 14, 1971 |
| [73] | Assignee | Deere & Company<br>Moline, Ill. |

[54] TREE SHEARING AND BUNCHING APPARATUS
10 Claims, 7 Drawing Figs.

[52] U.S. Cl.................................................. 280/179 R,
60/51, 60/52 HE, 214/77 R, 294/88, 280/402
[51] Int. Cl........................................................ B60p 7/00
[50] Field of Search........................................... 280/179 A,
179 R; 172/271; 214/147 G, 77; 212/7

[56] References Cited
UNITED STATES PATENTS

| 3,204,983 | 9/1965 | Rehnstrom et al............ | 280/179 A |
| 3,247,987 | 4/1966 | Lake .............................. | 214/147 G |
| 3,421,791 | 1/1969 | Lindquist ..................... | 214/77 |
| 3,549,029 | 12/1970 | Rutter .......................... | 214/77 R |

FOREIGN PATENTS

| 167,105 | 5/1959 | Austria......................... | 214/85.5 |

*Primary Examiner*—Leo Friaglia
*Assistant Examiner*—Robert R. Song
*Attorneys*—H. Vincent Harsha, Harold M. Knoth, William A. Murray and John M. Nolan ABSTRACT: A tree shear assembly and an accumulator assembly are supported on a mobile vehicle. The tree shear assembly includes a shear head mounted at the end of an articulated boom structure and having tongs for grasping a tree during the shearing operation and for holding the tree while the tree is swung into a skidding position wherein the lower portion of the tree is placed for support at two points on the accumulator assembly. The accumulator assembly includes a pair of pivoted tongs or arms which are swung towards and away from each other by a hydraulic actuator respectively for holding trees on the accumulator bed and for either permitting additional trees to be placed on the bed, or for permitting the entire load to be dropped in a bunch. The actuator is connected in a hydraulic system which supplies a source of constant fluid pressure to the actuator which in turn urges the arms into holding engagement with the trees on the accumulator assembly. The accumulator assembly is pivotally mounted on the vehicle for movement about vertical and horizontal axes so that the trees being skidded trail the vehicle and follow uneven terrain without placing undue stresses on the accumulator assembly.

INVENTORS
R. P. ZIMMERMAN
K. Q. KESSLER

INVENTORS
R. P. ZIMMERMAN
K. Q. KESSLER

INVENTORS
R. P. ZIMMERMAN
K. Q. KESSLER

TREE SHEARING AND BUNCHING APPARATUS

BACKGROUND OF THE INVENTION

The present invention relates to a tree shearing and bunching apparatus and more particularly relates to a novel accumulator assembly for receiving one or more trees in a skidable position wherein they are retained until dropped in bunches at desired locations.

Prior art apparatus are known which accumulate trees in a vertical position before or after the shearing operation after which, accumulated trees are swung to a horizontal position for piling them in a bunch on the ground. Since the trees are held in a vertical position, a problem of stability arises and the supporting vehicle must have a large base to ensure stability. Also, a large amount of power is required to swing the accumulated trees to the horizontal position for piling them on the ground.

Other prior art apparatus are known which include wire rope and choker assemblies for accumulating trees for skidding them to a desired landing or bunching area. These apparatus, while being simpler, require less power, and being more stable than the first-mentioned prior art apparatus, are usually difficult for one man to operate and considerable time is consumed in connecting and disconnecting the wire rope and choker assemblies.

SUMMARY OF THE INVENTION

According to the present invention, there is provided a novel tree accumulator assembly mounted on a vehicle carrying a tree-shearing assembly.

It is an object of the invention to provide an accumulator assembly for receiving trees to be carried or skidded.

A more specific object is to provide an accumulator assembly which is mounted for horizontal and vertical pivoting movement for permitting trees being skidded to trail the vehicle and follow the terrain.

A further object is to provide an accumulator assembly having a pair of hydraulically operated tongs and to provide a hydraulic system for supplying a constant fluid pressure to the actuator for operating the tongs for applying a constant closing force to the tongs.

A more specific object is to provide a pair of cross-connected tie bars or links between the arms of the accumulator assembly to restrain the tongs to swing symmetrically.

Still another object is to provide an accumulator assembly which one man can easily operate in conjunction with a tree shearing and/or tree-loading assembly.

These and other objects will become apparent from the ensuing description and appended drawings.

DESCRIPTION OF THE PREFERRED EMBODIMENT

Figure 1:
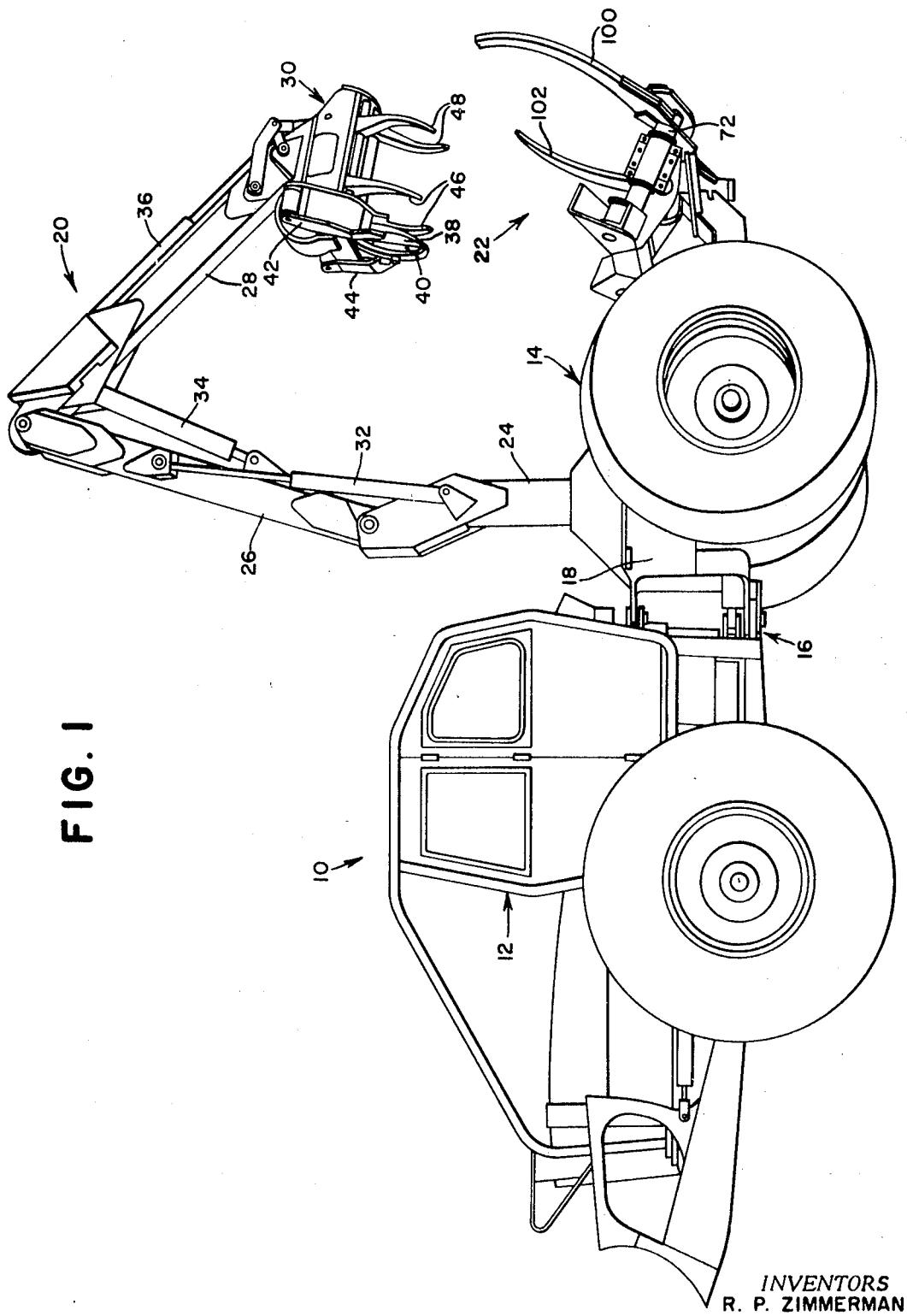
FIG. 1 is a left side perspective view of an articulated vehicle having a tree shear assembly and an accumulator assembly mounted thereon.

Referring now to FIG. 1, there is shown a typical logging vehicle indicated in its entirety by reference numeral 10. The vehicle 10 includes a forward two-wheeled tractor portion 12 and a rearward two-wheeled trailer portion 14. The tractor and trailer portions 12 and 14 are interconnected by a vertical pivot structure 16 making the vehicle 10 quite maneuverable through the woods. It is to be understood that the tractor portion 12 carries a suitable engine for driving the front wheels for propelling the vehicle and for powering the hydraulic actuators for the equipment mounted on the trailer portion 14. The trailer portion 14 includes a frame 18 which supports a shear assembly 20 and an accumulator assembly 22.

The shear assembly 20 includes a rotatable boom section 24, and intermediate and outer boom sections 26 and 28 respectively which are pivotally connected to each other and are respectively pivotally connected to the section 24 and a shear head 30. Between consecutive pairs of the boom sections 24, 26 and 28 are hydraulic actuators 32 and 34, and between the boom section 28 and the shear head 30, is a hydraulic actuator 36, the actuators being operative for swinging boom sections and the shear head vertically relative to each other. Mechanism (not shown) is operatively connected to the bottom of the boom section 24 for rotating the same.

The shear head 30 includes a pair of semicircular shear blades 38 and 40 carried by arms 42 and 44 and swingable towards and away from each other by a hydraulic actuator (not shown). Two pairs of tongs 46 and 48 are positioned and hydraulically operable for grasping a tree during the shearing operation and for holding the tree while it is swung into skidding position on the accumulator assembly 22. The accumulator assembly 22 is especially adapted for operation in conjunction with a shear assembly such as 20, however, it should be understood that the accumulator assembly 22 may be used with any loading device capable of handling trees or logs.

Figures 5, 6:
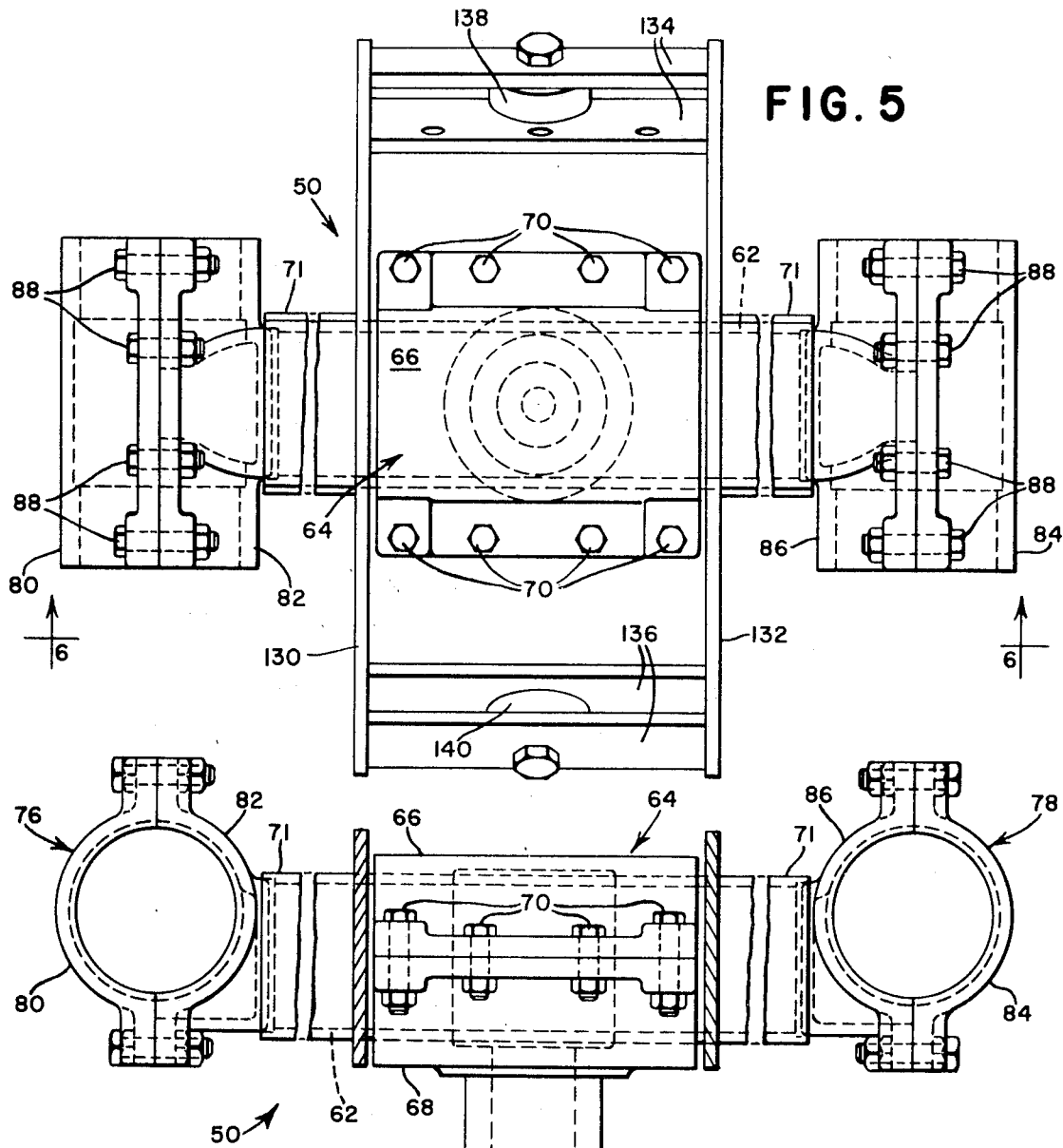
FIG. 5 is a top plan view of the accumulator assembly support frame.
FIG. 6 is a view taken along lone 6—6 of FIG. 5.

The accumulator assembly 22 includes a main frame 50 (FIGS. 5 and 6). The main frame 50 is mounted on the trailer frame 18 for horizontal and vertical pivoting movement by structure including a generally vertically disposed cylindrical tubular support 52 fixed to the rear of the trailer frame 18 on the central fore-and-aft axis of the vehicle 10 and having received therein a cylindrical pivot pin 54 which is retained by a screw 56 extending through a cap 58 bearing on the bottom of the support 52, and into a threaded hole 60 in the bottom of the pin 54. The main frame 50 includes a horizontally disposed tubular crossmember 62 which is journaled to pivot about its horizontal axis relative to the pin 54 and is fixed to the pin 54 to pivot therewith about the vertical axis of the pin 54. The connection between the pin 54 and the crossmember 62 includes a cylindrical tubular clamp 64 defining a horizontal axis and being journaled about the member 62. The clamp 64 includes separable halves 66 and 68 interconnected by a plurality of screws 70, the half 68 being integral with the top of the pin 54. The portions of the crossmember 62 extending beyond the opposite sides of the clamp 64 are protected by a pair of rectangular sheaths 71.

Figure 2:
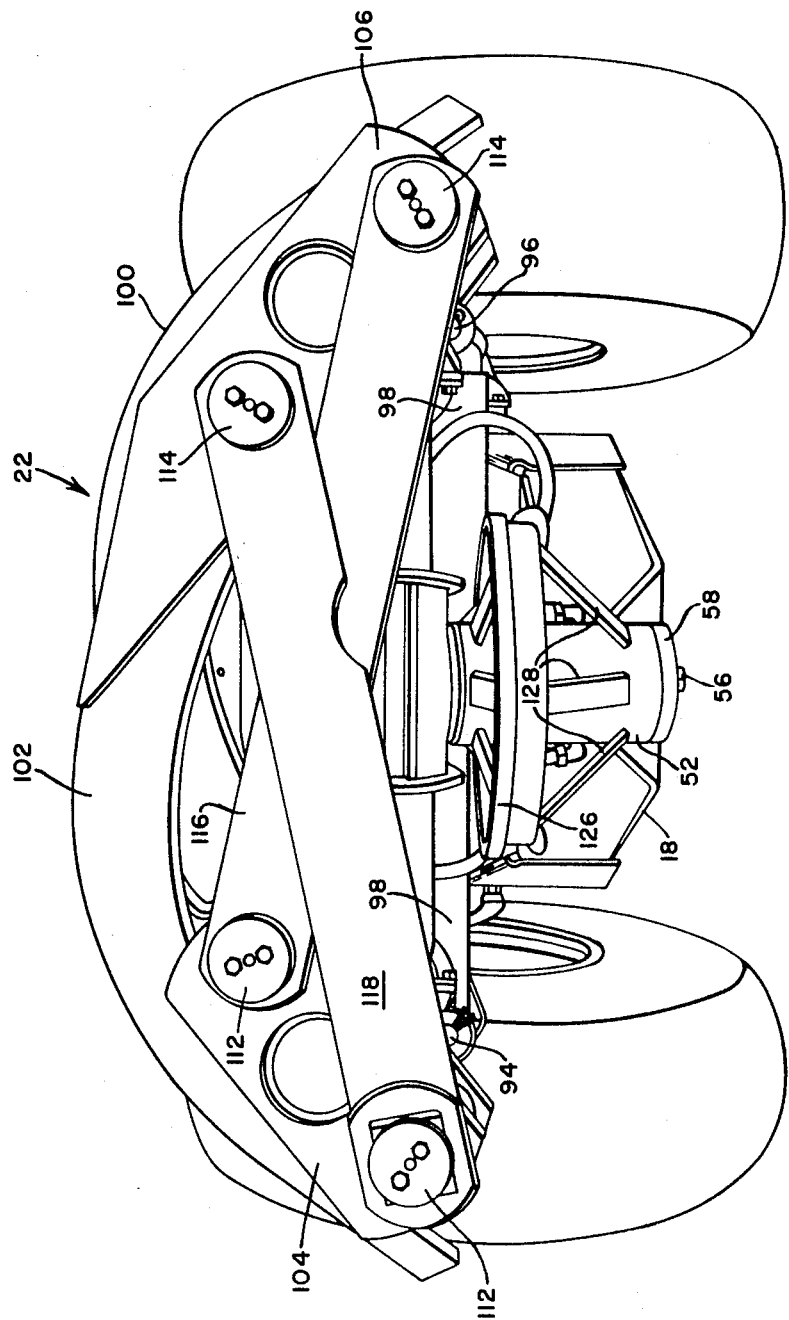
FIG. 2 is a rear perspective view of the accumulator assembly showing the same centered with respect to the central fore-and-aft axis of the vehicle and with the arms thereof in the fully closed position.

A pair of parallel pivot shafts 72 and 74 extend perpendicular to and are pivotally journaled intermediate their ends to the opposite ends of the crossmember 62 by cylindrical tubular clamps 76 and 78. The clamps 76 and 78 include separable halves 80, 82 and 84, 86 respectively, interconnected by a plurality of screws 88, the halves 82 and 86 being integral with the ends of the crossmember 62. Pairs of spaced plates 90 and 92 are fixed on the forward end portions of the shafts 72 and 74 and have connected therebetween pins 94 and 96 which serve to pivotally mount the opposite ends of a double-acting hydraulic actuator or motor 98. A pair of arcuate tongs or arms 100 and 102 are fixed on the rearward end portions of the shafts 70, 72 and 74 and are swung toward and away from each other between the fully opened and closed positions illustrated respectively in FIGS. 2 and 3 by alternate extension and retraction of the actuator 98. The structure securing the tongs or arms 100 and 102 to the shafts 72 and 74 includes pairs of spaced plates 104 and 106 which are received on and fixed respectively to the shafts 72 and 74. The spaced plates 104 and 106 have pairs of tubular receptacles 108 and 110 fixed therebetween at generally diametrically spaced locations with respect to the shafts 72 and 74 and have received therein pins 112 and 114. The pins 112 and 114 are so disposed that lines extending respectively through the centers of the pins 112 and 114 will intersect at a point below the accumulator assembly 22 when the tongs 100 and 102 are in their fully opened position and will intersect at a point above the accumulator assembly 22 when the tongs 100 and 102 are in their fully closed position. To ensure symmetrical opening and closing of the tongs 100 and 102, a pair of tie bars 116 and 118 are respectively cross-connected between the pairs of pins 112 and 114.

A shield 120 is provided for protecting the actuator 98 and fluid supply hoses associated therewith and includes a front upright portion 122 in which the forward ends of the pivot shafts 72 and 74 are pivotally mounted and an upper generally V-shaped portion 124 which is contiguous with the upright portion 122 and is angled over the actuator 98. The V-shaped portion 124 also affords one point of support and the tie bars 116 and 118 afford a second point of support for trees positioned on the accumulator assembly 22. In other words, the bed of the accumulator assembly 22 is made up of the V-shaped shield portion 124 and the top edges of the tie bars 116 and 118.

During skidding of the trees held by the accumulator assembly 22, the main frame 50 will pivot horizontally about the pin 54 and vertically about the axis of the crossmember 62. To limit vertical pivoting movement, an abutment ring 126 encircles a major portion of the support 52 and is fixed thereto by straps 128, the ends of the abutment ring being fixed to the frame 18. A pair of plates 130 and 132 cross and are fixed to the member 62 at the opposite ends of the clamp 64. A pair of spaced straps 134 and 136 innerconnect the opposite ends of the plates 130 and 132 and have rollers 138 and 140 pivoted thereto intermediate the ends thereof at positions on a common radius from the axis of the member 62 for contacting the ring 126 when the accumulator assembly 22 has undergone a predetermined amount of vertical movement.

The plates 130 and 132 also add to the support of the shield 120 through means of an L-shaped shield 142 which has one leg fastened to the rearward one of the pair of straps 134 and has the other leg fixed, as by welding, to the V-shaped portion 124 of the shield 120.

It is to be understood that many other means for limiting the vertical pivoting movement of the accumulator assembly may be employed and that means for limiting horizontal pivoting movement as well may be provided if desired.

Figure 7:
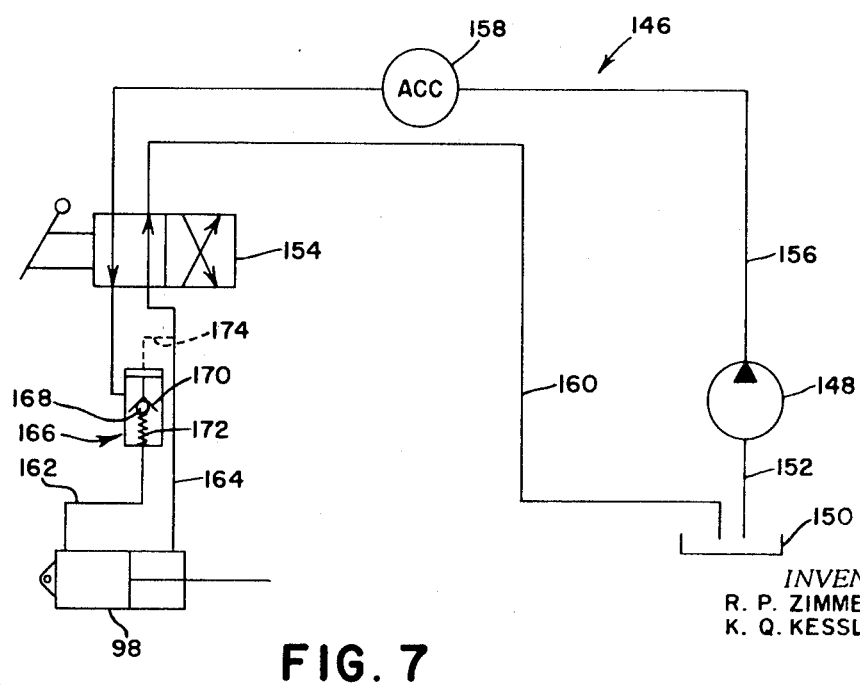
FIG. 7 is a schematic view of the hydraulic system for pressurizing the hydraulic actuator for operating the accumulator assembly tongs.
Figure 4:
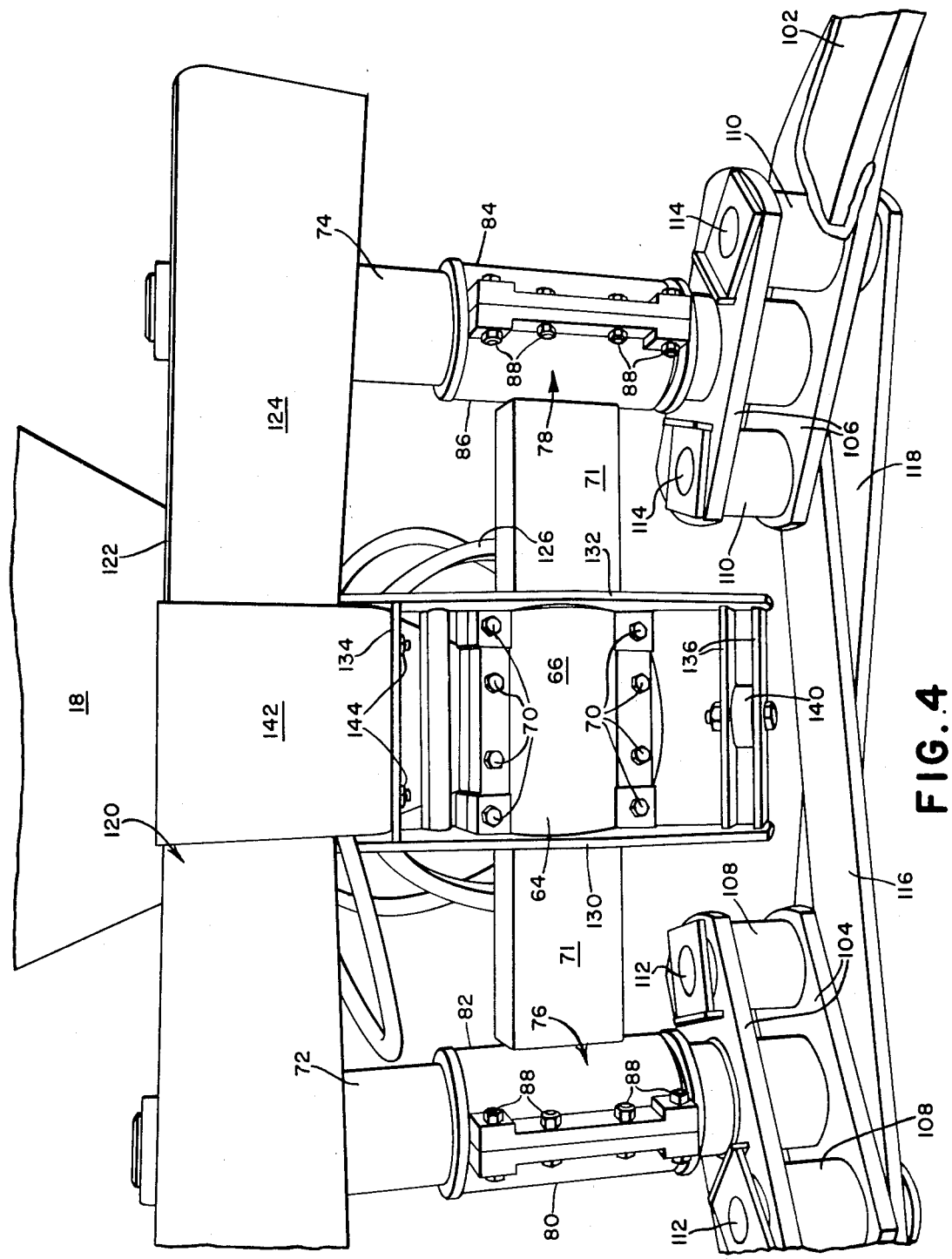
FIG. 4 is a top perspective view of the accumulator assembly.

A hydraulic system 146 for supplying a constant source of fluid pressure to the hydraulic actuator 98 is shown schematically in FIG. 7. The hydraulic system 146 includes a pump 148 interconnected with a reservoir 150 by an inlet line 152 and with a two-position, four-way direction control valve 154 by a pressure line 156. An accumulator 158 is connected in the line 156 and is of any known type wherein fluid may be stored at a desired pressure and which is operable to make up any cylinder or valve leakage should the pump stall or reach zero output but maintain pressure. A return line 160 is interconnected between the valve 154 and the reservoir 150. Connecting the valve 154 with the opposite work ports of the actuator 98 are a pair of lines 162 and 164. A pilot-operated check valve 166 is connected in the line 162 which is pressurized when the tongs 100 and 102 are in the closed position. The check valve 166 is operative for trapping fluid in the actuator 98 and keeping the tongs 100 and 102 tightly closed on trees positioned on the accumulator assembly 22 if for some reason pressure is reduced from the pump 148. The check valve 166 includes a check ball 168 which is normally biased against a seat 170 by a spring 172. A pilot line 174 is connected between the check valve 166 and the line 164 for urging the ball 168 off the seat 170 to permit fluid to exhaust through the line 162 when the line 164 is pressurized to open the tongs 100 and 102. While the actuator 98 is the only function shown in the system, it is to be understood that desired operation of the actuator 98 may be obtained by connecting it in any system capable of supplying it with a source of substantially constant fluid pressure as is supplied by any closed center system having a multiple of fluid functions controlled by closed center direction control valves.

In operation, the actuators of the shear assembly 20 are selectively actuated through suitable controls to open and position the shear blades 38 and 40 on opposite sides of a tree and to cause the pairs of tongs 46 and 48 to tightly grasp the tree. The tree is then severed by actuating the shear blades 38 and 40 to close towards each other. The blades 38 and 40 are left in the closed position wherein they cooperate to support the butt of the tree.

Figure 3:
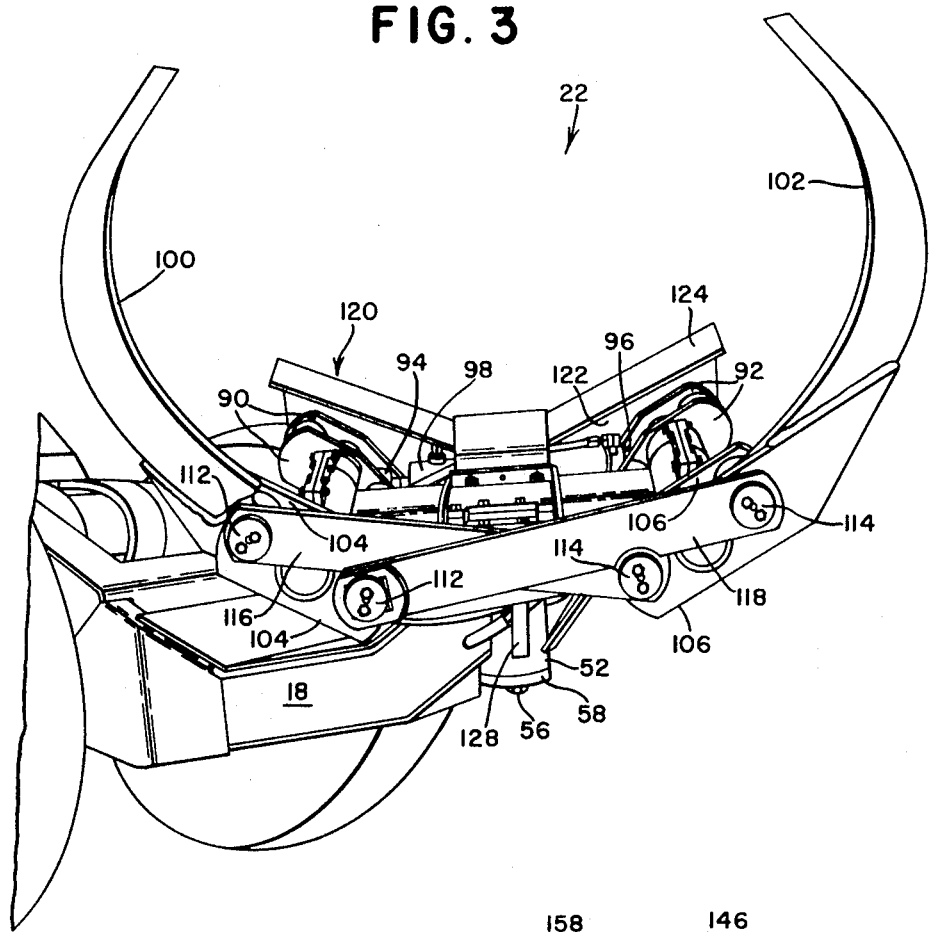
FIG. 3 is a perspective view of the accumulator assembly showing the same pivoted horizontally approximately 50° clockwise as viewed from the top and rear, from the fore-and-aft axis of the vehicle and with the arms thereof in the fully open position.

The control valve 166 is then shifted, if not already so positioned, to the left to connect the fluid pressure line 156 to the actuator 98 via the line 164 to retract the actuator 98 and cause the tongs 102 and 104 to swing to their open position illustrated in FIG. 3. It is to be noted that fluid pressure in the pilot line 174 admits pressure to hold the check ball 168 off the seat 170 to permit fluid to exhaust from the actuator 98 through the line 162 when the line 164 is pressurized.

The boom sections 24, 26 and 28 are then actuated to swing the severed tree into skidding position on the bed of the accumulator assembly 22 defined by the two contact points afforded by the V-shaped upper portion 124 of the shield 120 and the upper edges of the tie bars 116 and 118. The actuator 98 is then extended to close the tongs 102 and 104 and clamp the tree against the two contact points by shifting the control valve 166 to the position illustrated in FIG. 7 wherein fluid pressure from the pump 148 passes to the actuator 98 via the pressure line 156 and the line 162. The above procedure is duplicated for shearing additional trees and placing them on the accumulator assembly 22. After a desired number of trees are placed on the accumulator assembly 22, they are skidded to a landing area where they are bunched. If, during the skidding operation, the vehicle 10 makes a turn, the accumulator assembly may pivot horizontally as much as 90° clockwise or counterclockwise (as viewed from the top and rear) relative to the central fore-and-aft axis of the vehicle 10 about the upright axis of the pin 54 so as to permit the accumulated trees to trail the vehicle 10. If the vehicle 10 travels over uneven terrain, the accumulator assembly will pivot vertically about the axis of the crossmember 62 so as to prevent the accumulator assembly 22 from becoming overstressed. This vertical pivoting movement of the accumulator assembly 22 is limited by the rollers 138 and 140 coming into contact with the ring 126.

Should the load of trees shift during skidding, the constant pressure supplied by the pump 148 to the actuator 98 will cause the tongs 102 and 104 to instantaneously follow the shift and prevent any trees from being dropped from the accumulator assembly 22. If, for some reason, pressure is reduced from the pump 148, the check ball 168 will be urged against the seat 170 by the spring 172 to block fluid in the actuator 98 and thus keep the tongs 102 and 104 tightly engaged with the accumulated trees. If the pump should stall or reach zero output, but maintain pressure, the hydraulic accumulator 158 will make up any cylinder or valve leakage to keep the tongs closed.

We claim:

1. A tree-bunching apparatus comprising: a mobile vehicle having a support frame; an accumulator assembly including tree-supporting means and releasable gripping means for holding trees on said supporting means; mounting means mounting said accumulator assembly on said support frame; said supporting means including a generally horizontal cross frame member; a pair of pivot shafts rotatably mounted medially of their ends at the opposite ends of the cross frame member for rotation about respective axes extending perpendicular to the cross frame member; a pair of opposed tongs respectively fixed to one of the ends of said pivot shafts; and an extensible and retractable power means operatively connected to the other of the ends of said pivot shafts for swinging the tongs toward and away from each other.

2. The invention defined in claim 1 wherein said cross frame member is cylindrical; said mounting means includes an upright cylindrical receptacle fixed to said supporting frame; a pivot pin rotatably mounted in said receptacle and having a cylindrical tubular clamp at its upper end defining a generally horizontal axis and having the central portion of said cross frame member rotatably received therein.

3. The invention defined in claim 2 and further including a stop means including a ring disposed about said upright cylindrical receptacle and connected to said supporting frame and receptacle and a pair of rollers respectively positioned at a common radius on opposite sides of and secured to said crossmember; said radius being such that the rollers will respectively engage said ring after a predetermined amount of vertical pivoting movement of said accumulator assembly.

4. The invention defined in claim 2 wherein said mounting means includes an upright cylindrical receptacle fixed to said supporting frame; a pivot pin rotatably mounted in said receptacle and having a cylindrical tubular clamp at its upper end defining a generally horizontal axis and having the central portion of said cross frame member rotatably received therein.

5. The invention defined in claim 4 wherein the pivot pin connections are located approximately diametrically opposite on each of the pivot shafts; and cross linkage means including first and second tie bars crossed intermediate their ends and having their ends respectively connected to one of each of said pairs of pivot pin connections whereby the pivoting movement of said tongs is constrained such that the tongs pivot symmetrically.

6. The invention defined in claim 5 wherein the pivot connections are located adjacent one end of said pair of pivot shafts and the extensible and retractable power means is connected adjacent the other ends of said pair of pivot shafts; and a protective shield for said power means including a planar upright portion having said other end of said pivot shafts pivotally received therein and a V-shaped portion contiguous with said upright portion and angled over said power means, said V-shaped portion of said shield and the tops of said tie bars of said cross linkage cooperating to provide first and second support points for trees received on the accumulator assembly.

7. The invention defined in claim 1 wherein a pair of pivot pin connections are located approximately diametrically opposite on each of the pivot shafts and cross linkage means including first and second tie bars crossed intermediate their ends and having their ends respectively connected to one of each of said pairs of pivot pin connections whereby the pivoting movement of said tongs is constrained such that the tongs pivot symmetrically.

8. The invention defined in claim 7 wherein the pivot connections are located adjacent one end of said pair of pivot shafts and the extensible and retractable power means is connected adjacent the other end of said pivot shafts; and a protective shield for said power means including a planar upright portion having said other ends of said pivot shafts pivotally received therein and a V-shaped portion contiguous with said upright portion and angled over said power means, said V-shaped portion of said shield and the tops of said tie bars of said cross linkage cooperating to provide first and second support points for trees received on the accumulator assembly.

9. The invention defined in claim 1 wherein the extensible and retractable power means is a two-way hydraulic motor and further including a hydraulic system including a source of constant fluid pressure; a fluid reservoir; a two-position, four-way direction control valve; pressure and return lines interconnecting said source of constant fluid pressure with said direction control valve; a pair of lines connecting the opposite work ports of said actuator with the direction control valve; and a pilot-operated check valve means operatively connected in said pair of lines for trapping fluid in the hydraulic motor means and keeping the tongs tightly closed on trees in response to the source of fluid pressure dropping below a desired constant value.

10. The invention defined in claim 9 wherein the fluid system further includes a hydraulic accumulator operatively connected in the pressure line for making up cylinder or valve leakage should the source of fluid pressure either stall or reach a zero output, but maintain pressure.

* * * * *

UNITED STATES PATENT OFFICE
CERTIFICATE OF CORRECTION

Patent No. 3,627,351                    Dated 14 December 1971

Inventor(s) Robert Paul Zimmerman and Kenneth Quentin Kessler

It is certified that error appears in the above-identified patent and that said Letters Patent are hereby corrected as shown below:

Column 5, line 22, change "2" to -- 1 --.

Signed and sealed this 20th day of June 1972.

(SEAL)
Attest:

EDWARD M. FLETCHER, JR.          ROBERT GOTTSCHALK
Attesting Officer                Commissioner of Patents